(12) United States Patent
Nishitani et al.

(10) Patent No.: US 10,149,109 B2
(45) Date of Patent: Dec. 4, 2018

(54) WEARABLE DEVICE DETECTION

(71) Applicant: International Business Machines Corporation, Armonk, NY (US)

(72) Inventors: Yusuke Nishitani, Chiyoda-ku (JP); Masaki Saitoh, Yokohama (JP); Asuka Unno, Koutou-ku (JP)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 15/209,807

(22) Filed: Jul. 14, 2016

(65) Prior Publication Data

US 2018/0020331 A1    Jan. 18, 2018

(51) Int. Cl.
*H04W 4/029*  (2018.01)
*H04W 84/18*  (2009.01)
*H04W 4/80*  (2018.01)
*H04W 8/00*  (2009.01)

(52) U.S. Cl.
CPC ............. *H04W 4/029* (2018.02); *H04W 4/80* (2018.02); *H04W 84/18* (2013.01); *H04W 8/005* (2013.01)

(58) Field of Classification Search
CPC ... H04W 4/028; H04W 24/08; H04W 4/0008; H04W 4/02; H04W 4/00
See application file for complete search history.

(56) References Cited

U.S. PATENT DOCUMENTS

| | | | |
|---|---|---|---|
| 7,657,256 B2 | 2/2010 | Bates et al. | |
| 7,668,537 B2 | 2/2010 | De Vries | |
| 8,810,392 B1 | 8/2014 | Teller et al. | |
| 2006/0023626 A1 | 2/2006 | Krausz | |
| 2008/0285542 A1 | 11/2008 | Jachner | |
| 2010/0188226 A1 | 7/2010 | Seder et al. | |
| 2013/0005362 A1* | 1/2013 | Borghei | H04W 4/021 455/456.3 |

(Continued)

FOREIGN PATENT DOCUMENTS

| | | |
|---|---|---|
| JP | 2004312694 A | 11/2004 |
| JP | 2007060172 A | 3/2007 |

(Continued)

OTHER PUBLICATIONS

Amir, et al., "Buddy tracking—efficient proximity detection among mobile friends", Pervasive and Mobile Computing, vol. 3, Issue 5, Oct. 2007, pp. 489-511, <http://www.sciencedirect.com/science/article/pii/S1574119207000028>.

(Continued)

*Primary Examiner* — Frantz Bataille
(74) *Attorney, Agent, or Firm* — Alexander G. Jochym

(57) ABSTRACT

A computer-implemented method includes, by a first terminal device among a plurality of terminal devices in a vicinity of a user, receiving a frequency of coexistence from each of one or more second terminal devices among the plurality of terminal devices. The first terminal device and each of the second terminal devices each store a frequency of coexistence, wherein the frequency of coexistence shows a fre- (Continued)

quency that a terminal device which stores the frequency of coexistence and each of one or more other terminal devices coexisted in the vicinity at a predetermined location. The method further includes calculating a mean value of the frequencies of coexistence for each of the terminal devices which are not currently in the vicinity of the user, and, if the mean value is equal to or larger than a predetermined threshold, concluding that a terminal device is not in the vicinity of the user.

17 Claims, 15 Drawing Sheets

(56) References Cited

U.S. PATENT DOCUMENTS

| | | | |
|---|---|---|---|
| 2014/0113674 A1 | 4/2014 | Joseph et al. | |
| 2014/0362710 A1 | 12/2014 | Mukherjee et al. | |
| 2015/0087324 A1* | 3/2015 | Ishida | H04L 5/0035 |
| | | | 455/452.2 |
| 2016/0057639 A1* | 2/2016 | Smith | H04W 4/029 |
| | | | 455/423 |

FOREIGN PATENT DOCUMENTS

| | | |
|---|---|---|
| JP | 2011217128 A | 10/2011 |
| JP | 2013225168 A | 10/2013 |
| JP | 2014119889 A | 6/2014 |

OTHER PUBLICATIONS

Lubke, et al., "MobilisGroups: Location-based Group Formation in Mobile Social Networks", IEEE Second Workshop on Pervasive Collaboration and Social Networking, Mar. 21-25, 2011, pp. 502-507, <http://ieeexplore.ieee.org/xpl/articleDetailsjsp?tp=&arnumber=5766941&url=http%3A%2F%2Fieeexplore.ieee.org%wFxpls%2Fabs_alljsp%3Farnumber%3D5766941>.

Hiruta, "GLoBES: A Spatio-Temporal Grouping Algorithm using Micro-Blog Entries", Abstract of Bachelor's Thesis, Academic Year 2010, 1 page, <http://www.sfc.wide.adjp/thesis/2010/files/hiru-publish-thesis.pdf>.

Mochizuki, et al., "Mobile Device Proximity Notification", U.S. Appl. No. 14/731,590, filed Jun. 5, 2015, 54 pages.

Mochizuki, et al., "Mobile Device Proximity Notification", U.S. Appl. No. 15/146,930, filed May 5, 2016, 48 pages.

\* cited by examiner

| Target (%) / Source (%) | Laptop A | Laptop B | Smart phone | Smart watch | Smart ring | Tablet 1 | Employee ID card |
|---|---|---|---|---|---|---|---|
| Laptop A | - | 90 | 91 | 60 | 85 | 24 | 96 |
| Laptop B | 0 | - | 97 | 62 | 79 | 30 | 95 |
| Smart phone | 2 | 83 | - | 72 | 86 | 31 | 97 |
| Smart watch | 0 | 92 | 93 | - | 79 | 28 | 97 |
| Smart ring | 1 | 84 | 98 | 58 | - | 29 | 98 |
| Tablet 1 | 0 | 60 | 82 | 47 | 86 | - | 96 |
| Employee ID card | 3 | 99 | 98 | 74 | 82 | 25 | - |

| Recognized terminal (%) / Existing terminal (%) | Laptop A | Laptop B | Smart phone | Smart watch | Smart ring | Tablet 1 | Employee ID card |
|---|---|---|---|---|---|---|---|
| Laptop B | 0 | - | 97 | 62 | 79 | 30 | 95 |
| Smart watch | 0 | 92 | 93 | - | 79 | 28 | 97 |
| Employee ID card | 3 | 99 | 98 | 74 | 82 | 25 | - |

611

| Laptop A | Laptop B | Smart phone | Smart watch | Smart ring | Tablet 1 | Employee ID card |
|---|---|---|---|---|---|---|
| 0 | 95 | 96 | 68 | 30 | 30 | 96 |

FIG. 6

WEARABLE DEVICE DETECTION

BACKGROUND

The present invention relates generally to mobile and wearable devices, and more particularly to detecting the proximity, presence, and/or absence of wearable mobile devices.

As wearables gain in popularity alongside handheld devices, the number of electronic terminals that a user carries at once is increasing. For example, a user may carry a set of items, such as smartphone, tablet, and/or employee ID card at both home and work. Without their accustomed complement of devices, users may become inefficient, frustrated, or even endangered. Users benefit from preventing their devices from being forgotten, lost, or misplaced.

SUMMARY

A computer-implemented method includes, by a first terminal device among a plurality of terminal devices which are currently in a vicinity of a user, receiving a frequency of coexistence from each of one or more second terminal devices among the plurality of terminal devices. The first terminal device and each of the second terminal devices each store a frequency of coexistence, wherein the frequency of coexistence shows a frequency that a terminal device which stores the frequency of coexistence and each of one or more other terminal devices coexisted in the vicinity at a predetermined location. The computer-implemented method further includes calculating, from the frequency of coexistence which is stored in the first terminal device and the received frequencies of coexistence, a mean value of the frequencies of coexistence for each of the terminal devices which are not currently in the vicinity of the user, and, if the mean value is equal to or larger than a predetermined threshold, concluding that a terminal device associated with the mean value is not in the vicinity of the user. A corresponding terminal device, computer system, and computer program product are disclosed.

BRIEF DESCRIPTION OF THE DRAWINGS

FIG. 5 illustrates a list of frequencies of coexistence, in accordance with at least one embodiment of the present invention.

FIG. 6 illustrates a list of frequencies of coexistence which are generated in a master terminal device or server and a list of mean values calculated from the frequencies of coexistence for each of the terminal devices, in accordance with at least one embodiment of the present invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term, "a terminal device", may refer to any device that communicates with one or more other devices. The terminal device is capable of communicating over a wireless network and can include at least one communication function, for example, but not limited to, a direct communication between terminal devices such as a peer to peer communication, using for example, Bluetooth®, infrared communication or near-field communication (NFC); or an indirect communication between terminal devices, for example, using wireless spot such as a Wi-Fi® access point, or using a server. These capabilities can allow a connection to one or more other terminal devices directly or through an internet or intranet; or to a server through an internet or intranet.

The terminal device may have at least a CPU and a memory or an IC chip having a CPU and a memory. The terminal device may be a mobile terminal device or a wearable terminal device. The terminal device may be a computing device that is typically small enough to be handheld, wear it, or carry it, for example, in a bag or by hand.

The first terminal device mentioned above may correspond to a master terminal device mentioned in the present specification. The second terminal device mentioned above may correspond to a member terminal device mentioned in the present specification. The terminal device can become a master terminal device or a member terminal device, according to the process described in FIG. 2A mentioned below.

The terminal device may be, for example, but not limited to, the following: a smart phone; a cellular phone; a tablet; a smart watch; a smart ring; a smart earphone; a game device; an electronic book device; a music player device; a Wi-Fi device; a mobile battery; a glasses device, a laptop or note book type computer; a card such as an ID card, for example, an employee ID card, a transportation card or an electronic money card; a home key.

Figure 1:
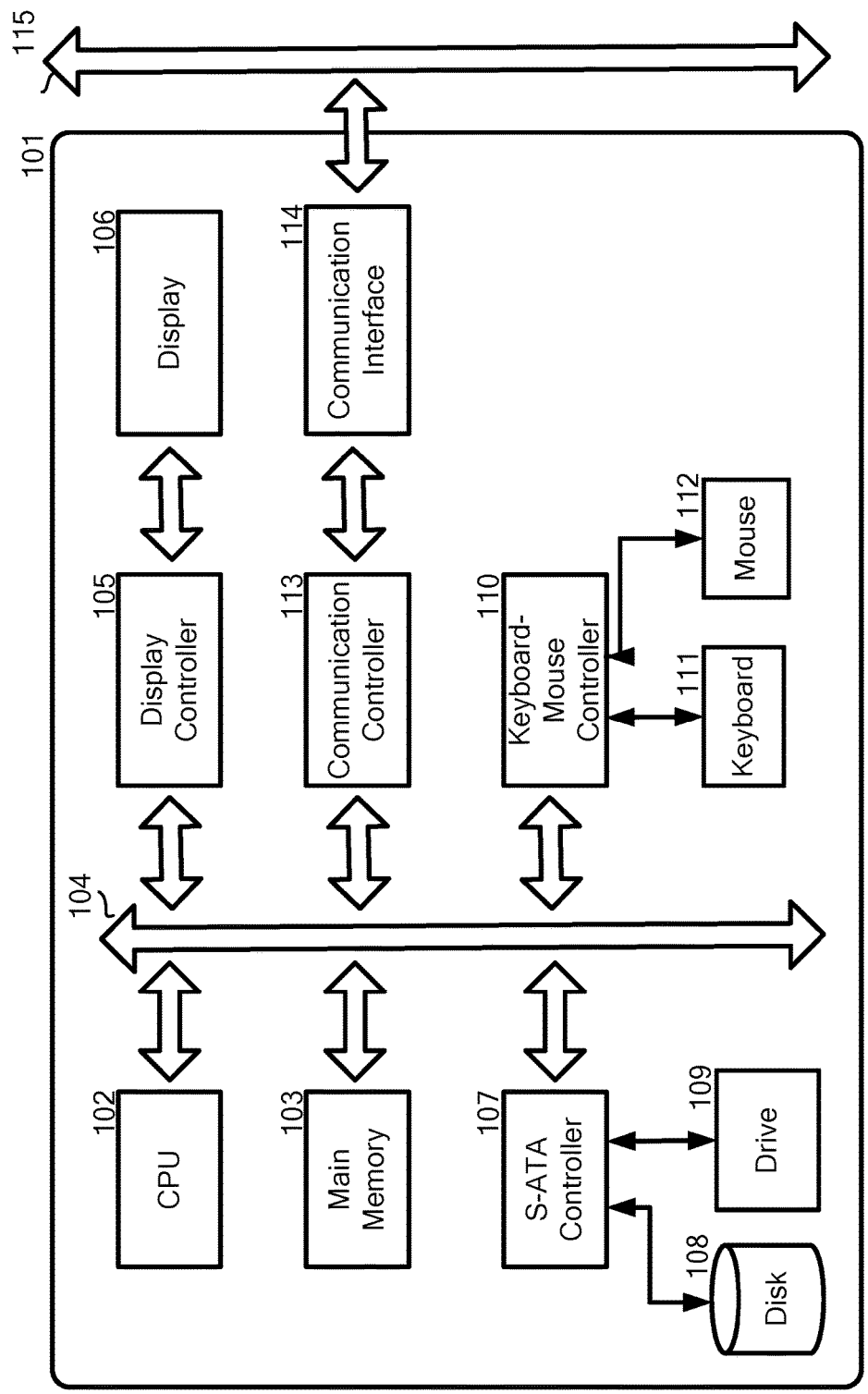
FIG. 1 illustrates an exemplified basic block diagram of a computer hardware used in an embodiment of the present invention.

With reference now to FIG. 1, FIG. 1 illustrates an exemplified basic block diagram of a computer hardware, such as a terminal device or server, which computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core I™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be described with reference to the following FIG. 2, FIGS. 3A and 3B, FIGS. 4A to 4C, FIG. 5, FIG. 6, FIGS. 7A to 7C and FIGS. 8A and 8B.

Figure 2:
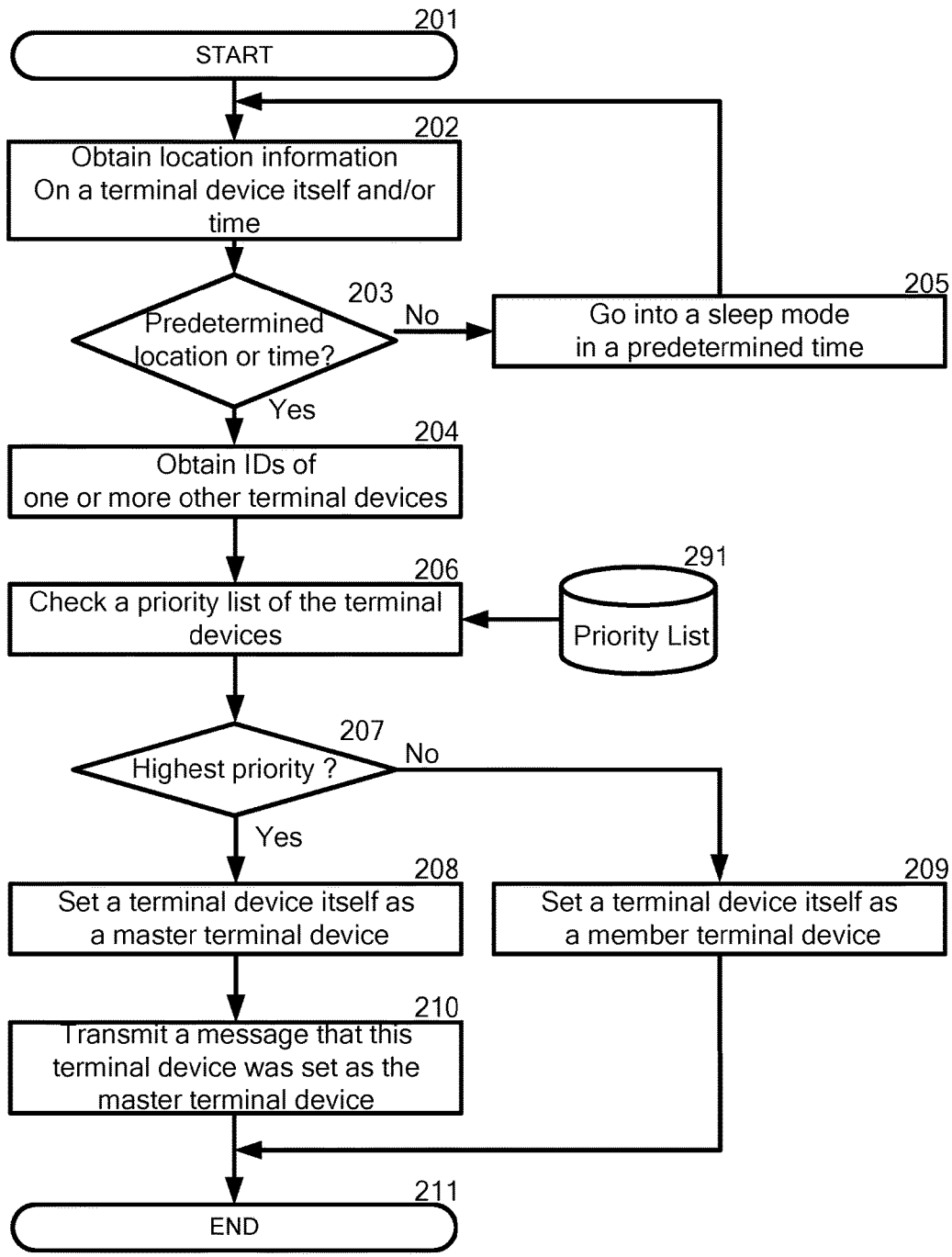
FIG. 2 illustrates a flowchart of a process for determining whether a terminal device itself is a master or member terminal device, in accordance with at least one embodiment of the present invention.
Figure 3A:
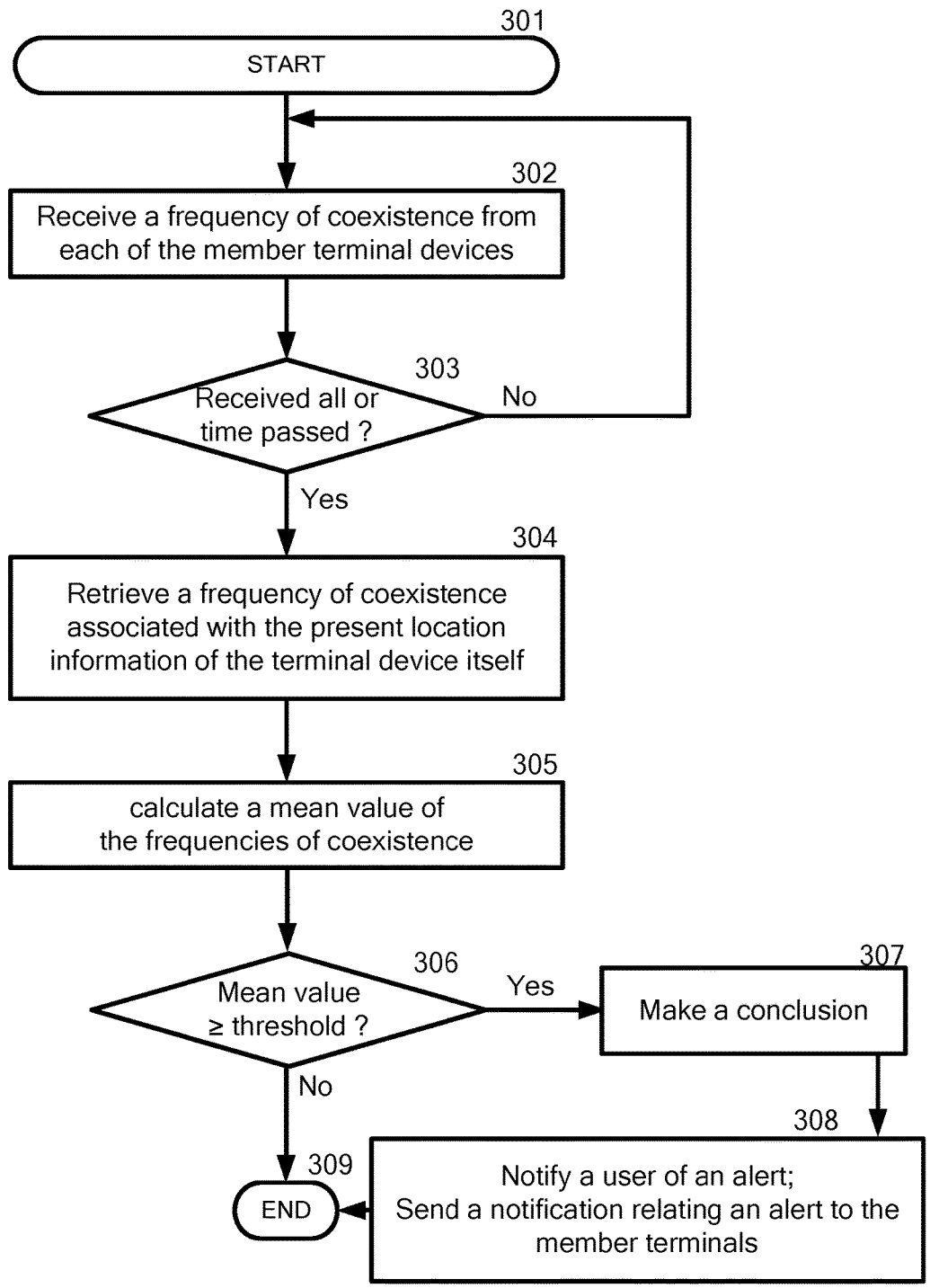
FIG. 3A illustrates a flowchart of a process performed by a master terminal device for detecting that one or more terminal devices are not in the vicinity of a user, in accordance with at least one embodiment of the present invention.
Figure 3B:
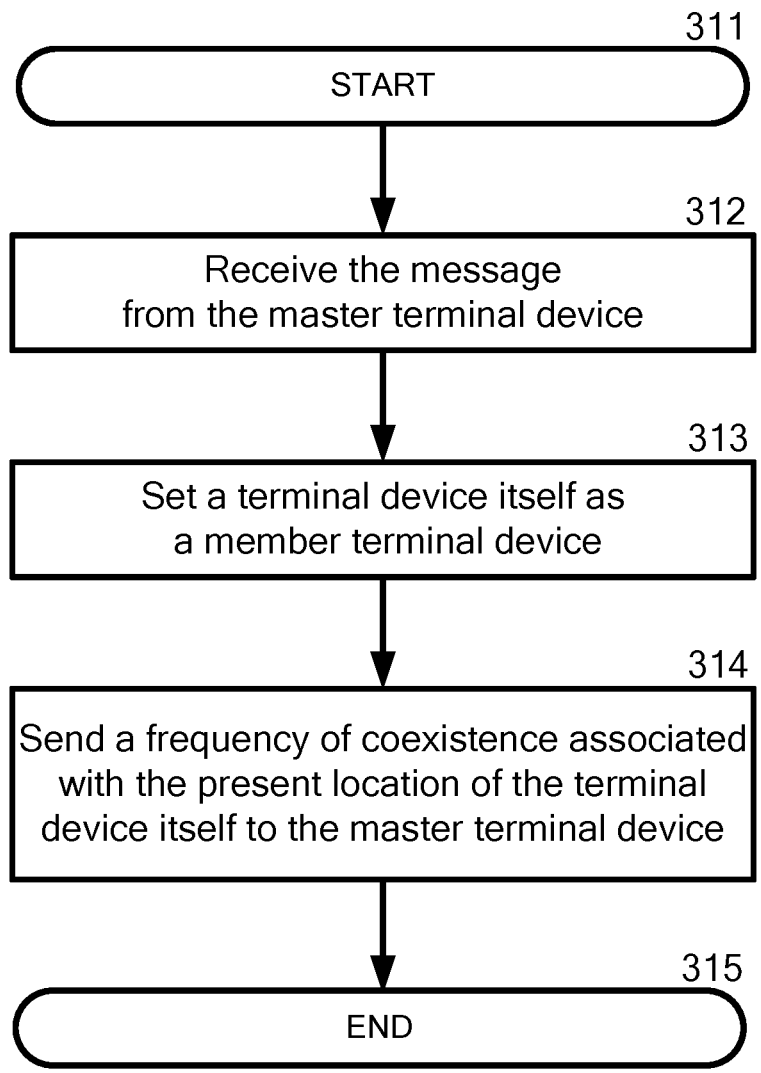
FIG. 3B illustrates a flowchart of a process performed by one or more member terminal devices, in accordance with at least one embodiment of the present invention.

FIGS. 2, 3A and 3B illustrate an embodiment of an overall flowchart of a process performed by a plurality of terminal devices for detecting that one or more terminal devices are not in the vicinity of a user.

With reference now to FIG. 2, FIG. 2 illustrates an embodiment of a flowchart of a process for determining whether a terminal device itself is a master or member terminal device.

Each of the terminal devices associated with a user, such as the computer (101), performs the process described in FIG. 2.

In step 201, the terminal device starts the process mentioned above. For example, the terminal device may start the process at the time in a case where a power of the terminal device is turned on or a predetermined time passes.

In step 202, the terminal device may obtain location information on the terminal device itself, present time or a combination of these.

The location information can be obtained by global positioning system (GPS), Beacon or a Wi-Fi® access point. The present time can be obtained by using an internal time or GPS.

The terminal device may obtain the location information, the present time or combination of these, for example, at a predetermined time interval, such as a second, a minute, an hour or a day; according to a predetermined time schedule; or in a case where the terminal device passes a predetermined place.

In step 203, the terminal device may determine whether the obtained location information is in a predetermined location or not. The predetermined location may be set to by the following manner: (1) manually inputting one or more locations by a user; or (2) by automatically determining one or more locations by one or more terminal devices or a server. The predetermined location may be determined using history information that the user moved, information on time that the user moved, or a combination of these. Also, the predetermined location may be determined using information on a location where the number of the terminal devices in the vicinity of the user or a set of terminal devices was remained or changed. Also, the predetermined location may be determined using information on a time that the number of terminal devices in the vicinity of the user was remained or changed. An example of automatically determining one or more predetermined locations will be explained by referring to FIGS. 4A to 4C mentioned below.

Alternatively, the terminal device may determine whether the obtained time information is in a predetermined time or not. The predetermined time may be set to by the following manner: (1) manually inputting a set of time by a user; or (2) by automatically determining time by one or more terminal devices or a server. The predetermined time may be determined using history information that the user moved, information on time that the user moved, or a combination of these. Also, the predetermined time may be determined using a time in a case where the number of the terminal devices in the vicinity of the user or a set of terminal devices was remained or changed. Also, the predetermined time may be determined using a time period that a set of terminal devices are in the vicinity of the user.

An example of automatically determining one or more predetermined time will be explained by referring to FIG. 4B mentioned below.

Alternatively, the terminal device may determine whether the combination of the obtained location information and time information is in a predetermined location and time or not. An example of automatically determining a combination of one or more predetermined time and location will be explained by referring to FIG. 4B mentioned below.

If the judgment is positive, the terminal device proceeds to step 204. Namely, in a case where the user enters into or passes through a predetermined location, in a case where a predetermined time passes, or in a case where a combination of these happens the terminal device proceeds to step 204. Meanwhile, if the judgment is negative, the terminal device proceeds to step 205.

In step 204, the terminal device obtains ID of one or more other terminal devices which can be connected through a communication function, for example, but not limited to, a direct communication between terminal devices such as a peer to peer communication, using, for example, Bluetooth®, infrared communication or near-field communication (NFC); or an indirect communication between terminal devices, for example, using wireless spot such as a Wi-Fi® access point, or using a server. The ID may be a unique ID associated with or assigned to a terminal device.

In step 205, the terminal device may go in to a sleep mode in a predetermined time.

In step 206, the terminal device reads, from a storage (291), a priority list of the terminal devices and then checks a priority list to know the priority of the terminal device itself.

The priority list has a set of an ID of a terminal device and a priority order associated with the terminal device.

The priority list may be generated in advance or dynamically. For example, the priority list can be generated as follows: (1) the priority list generated in advance may be generated, for example, according to a computing performance such as a CPU power or a battery capacity; (2) the priority list which can be dynamically generated may be generated, for example, according to a consumption degree of a computing performance or a level of remaining battery; or (3) the priority list generated in advance or which can be dynamically generated may be generated according to a frequency that a user associated with the terminal device carries the terminal device. In a case of (1) mentioned above, the user can input a priority order of terminal devices in advance.

For example, a master terminal device is selected from a terminal device having a high computing performance among the plurality of the terminal devices; a terminal device having a high remaining battery among the plurality of the terminal devices; or a terminal device that the user always carries with her or him among the plurality of the terminal devices.

In step 207, the terminal device determines whether the terminal device itself has the highest priority or not. If the judgment is positive, the terminal device proceeds to step 208. Meanwhile, if the judgment is negative, the terminal device proceeds to step 209.

In step 208, the terminal device sets a terminal device itself as a master terminal device. If the terminal device is set as the master terminal device, this terminal device acts as a device which is used for detecting that one or more terminal devices are not in the vicinity of a user.

In step 209, the terminal device sets a terminal device itself as a member terminal device. If the terminal device is set as the member terminal device, this terminal device acts as a device which is used for transmitting a frequency of coexistence to a master terminal device.

In step 210, the terminal device transmits a message to each of the member terminal devices through the communication function mentioned in step 204. The message may include to the effect that this terminal device was set as the master terminal device or that the terminal which receives the message shall be set as a member terminal device. Optionally, the terminal device may further transmit a present location information to each of the member terminal devices through the communication function mentioned in step 204.

In step 211, the terminal device terminates the process mentioned above.

With reference now to FIG. 3A, FIG. 3A illustrates an embodiment of an overall flowchart of the process performed by a master terminal device which is selected among the plurality of terminal devices.

The master device is one selected according to the process described in FIG. 2.

Let us suppose that each of the terminal devices stores a frequency of coexistence at each of the specific locations. Accordingly, the master terminal device stores a frequency of coexistence at each of the specific locations. Similarly, each of the member terminal devices also stores a frequency of coexistence at each of the specific locations.

The frequency of coexistence shows a frequency that a terminal device which stores the frequency of coexistence and each of one or more other terminal devices coexisted in the vicinity at a predetermined location. Accordingly, the frequency of coexistence is associated with a location information.

The frequency of coexistence may be obtained prior to start of the process described in FIG. 2.

An example of a frequency of coexistence will be explained by referring to FIG. 5 mentioned below.

In step 301, the master terminal device starts the process mentioned above after the process described in FIG. 2.

In step 302, the master terminal device receives, through the communication function mentioned in step 204, a frequency of coexistence which is associated with location information of the master terminal device from each of one or more member terminal devices which can be connected through a communication function among the plurality of terminal devices associated with a user.

The receipt of the frequency of coexistence is carried out by a communication between the master terminal device and each of the member terminal devices. Alternatively, the receipt of the frequency of coexistence is carried out by an access point or server between the master terminal device and each of the member terminal devices.

In step 303, the master terminal device determines whether the master terminal device receives a frequency of coexistence from all member terminal devices which can be connected through the communication function mentioned in step 204. If the judgment is positive, the master terminal device proceeds to step 304. Meanwhile, if the judgment is negative, the master terminal device proceeds back to step 302.

In step 304, the master terminal device retrieves a frequency of coexistence which is associated with the present location information of the master terminal device itself. The master terminal device may generate a list of frequencies of coexistence, using the retrieved frequency of coexistence and the received frequency(ies) of coexistence.

In step 305, the master terminal device calculates, from the frequency of coexistence which is stored in the master terminal device and the frequencies of coexistence which was received from each of the member terminal devices, a mean value of the frequencies of coexistence for each of terminal devices which are not currently in the vicinity of the user. The master terminal device may calculate the frequency of coexistence for each of the member terminal devices; or for each of the member terminal devices from which the master terminal device did not receive a frequency of coexistence; or for each of the member terminal devices with which the master terminal device cannot communicate.

The mean value may be calculated, for example, using a geometric mean of the frequencies of coexistence. An example of calculating a geometric mean of the frequencies of coexistence will be explained by referring to FIG. 6A, Table (601) mentioned below.

In step 306, the master terminal device determines whether the calculated mean value is larger than or equal to a predetermined threshold or not. If the judgment is positive, the master terminal device proceeds to step 307. Meanwhile, if the judgment is negative, the master terminal device proceeds to a final step 309.

In step 307, the master terminal device concludes that a member terminal device associated with the mean value is not in the vicinity of the master terminal device or a user associated with the terminal device. The term, "vicinity" may refer that a terminal device is not carried or worn by a user or is not located near the user.

In step 308, the master terminal device may notify the user of an alert to the effect that a specific member terminal device is not in the vicinity. Further, the master terminal device may send a notification relating to an alert to each of the member terminal devices.

In response to the conclusion or the notification, at least one terminal device among the plurality of terminal devices which are currently in the vicinity of the user, that is, the master terminal device or the member terminal device, may take a predefined action. The predefined action may relate to a security action relating to a terminal device. For example, The predefined action may be the following: at least one terminal device among the plurality of terminal devices which are currently in the vicinity of the user is made unusable, for example, a power of a terminal device turns down; or the lock screen or password request screen appears on a display of a terminal device; or an authentication level associated with at least one terminal device among the plurality of terminal devices which are currently in the vicinity of the user is changed, for example, an access to an internet, to a web page, to a file or to a storage is limited.

In step 309, the master terminal device terminates the process mentioned above.

With reference now to FIG. 3B, FIG. 3B illustrates an embodiment of an overall flowchart of the process performed by one or more member terminal devices.

Each of the member terminal devices is one selected according to the process described in FIG. 2.

Each of the member terminal devices may perform the process.

In step 311, the terminal device starts the process mentioned above.

In step 312, the terminal device receives the message which was transmitted in step 210 described in FIG. 2.

In step 313, the terminal device sets a terminal device itself as a member terminal device.

In step 314, the terminal device which is now the member terminal device retrieves a frequency of coexistence which is associated with the present location information. The present location information may be obtained from the member terminal device itself or may be one which has been received, from the master terminal device, in step 210 mentioned above. The member terminal device then transmits the retrieved frequency of coexistence to the master terminal device through the communication function mentioned in step 204.

In step 315, the member terminal device terminates the process mentioned above.

In a case where a person has or wears plurality of terminal device, it may be difficult to manage all of the terminal devices. However, according to one embodiment described in FIGS. 3A and 3B, a person can notice a terminal devices which is dropped, lost or left somewhere.

Further, according to one embodiment described in FIGS. 3A and 3B, the conclusion can be made only among terminal devices. Therefore, a server is not necessarily required for detecting that one or more terminal devices are not in the vicinity of a user. Further, a specific terminal device is not required, since any set of the terminal devices can perform the one embodiment described in FIGS. 3A and 3B.

Figure 4A:
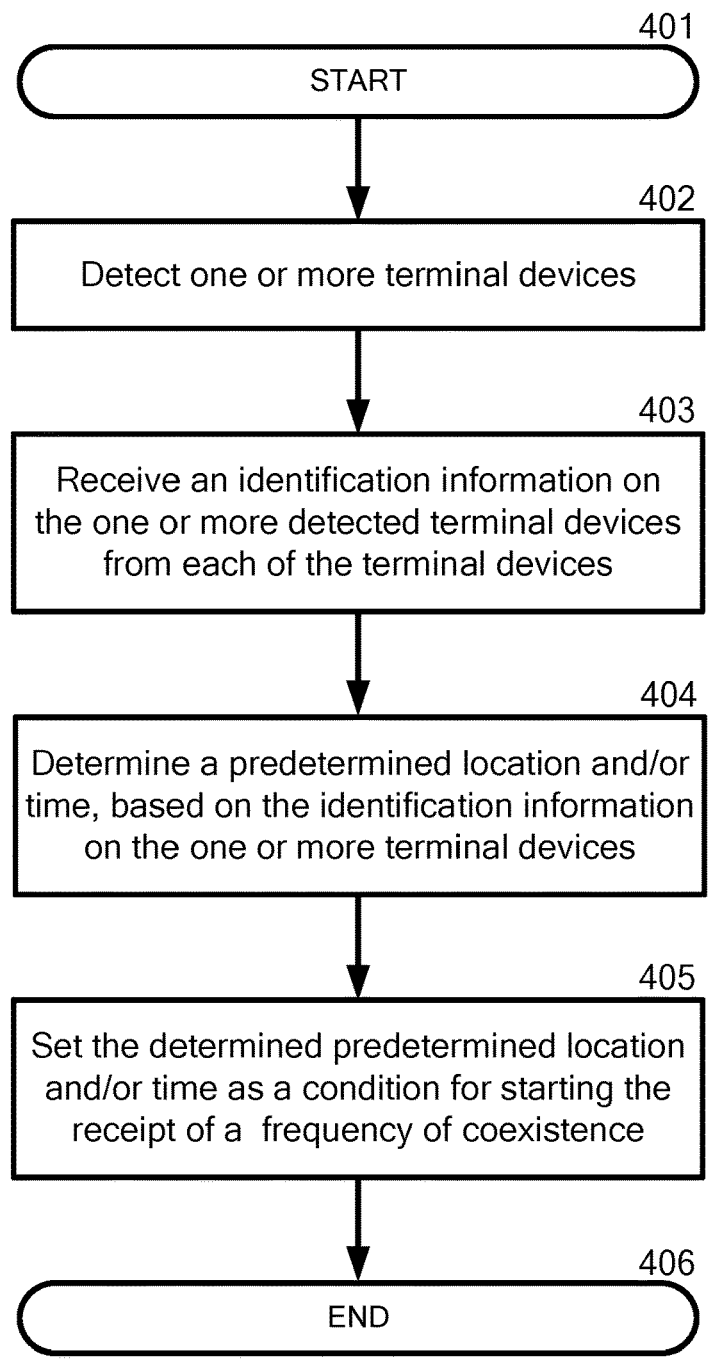
FIG. 4A illustrates a flowchart of a process performed by a terminal device for determining and setting a predetermined location or time, in accordance with at least one embodiment of the present invention.
Figure 4B:
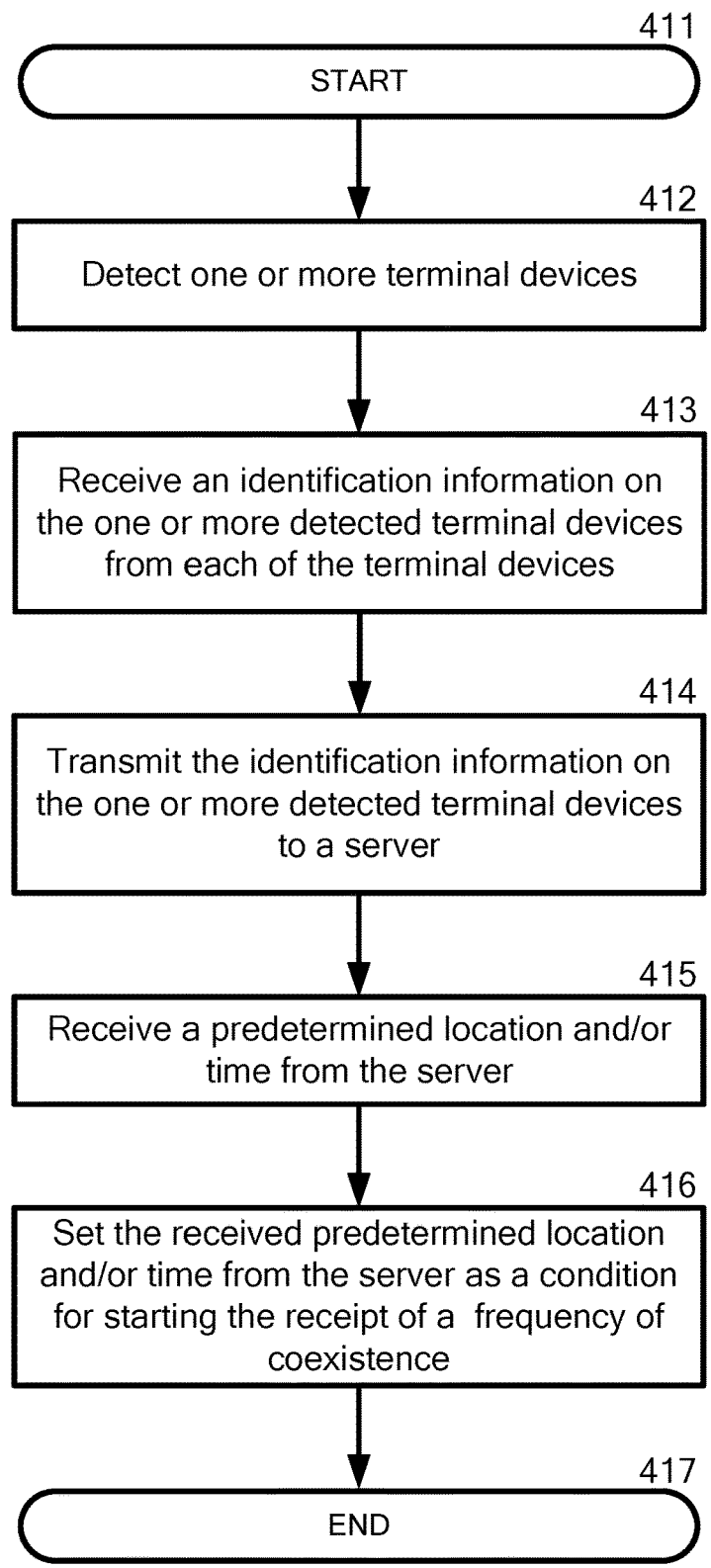
FIG. 4B illustrates a flowchart of a process performed by a terminal device for determining and setting a predetermined location or time in cooperation with a server, in accordance with at least one embodiment of the present invention.
Figure 4C:
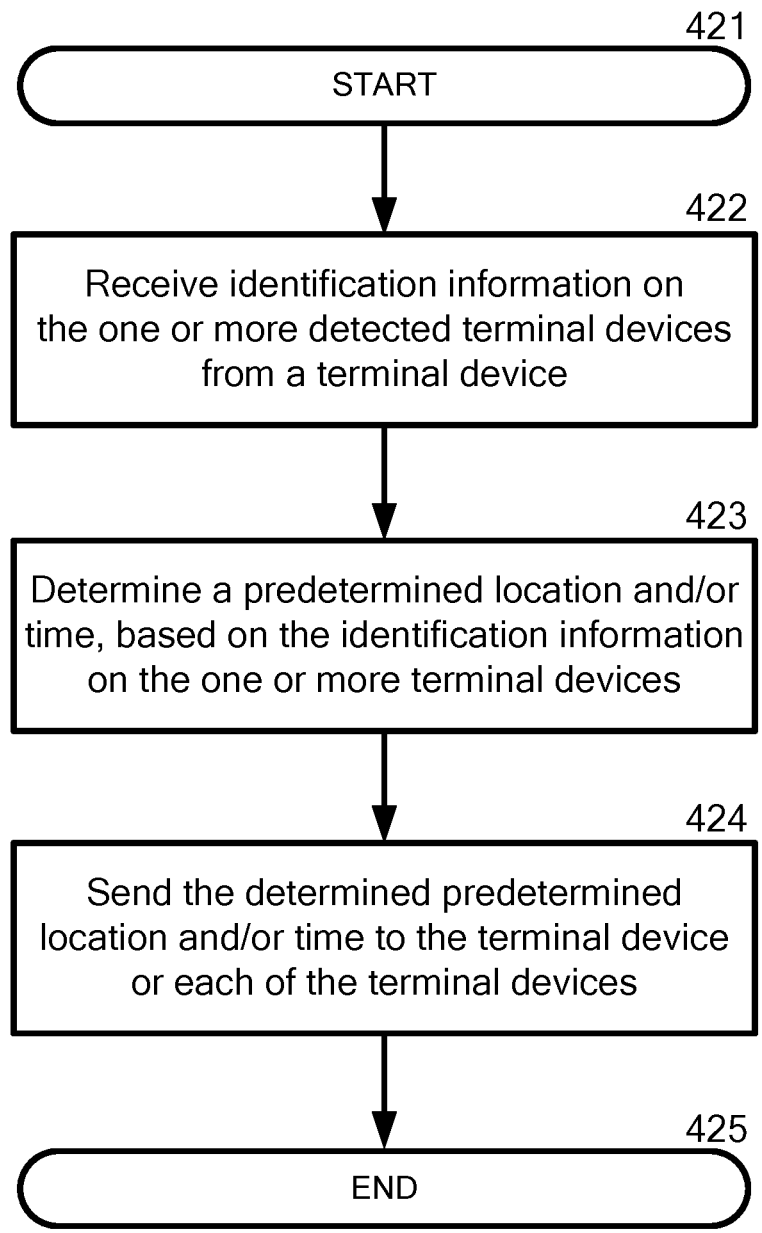
FIG. 4C illustrates a flowchart of a process performed by a server for determining and setting a predetermined location or time in cooperation with terminal devices, in accordance with at least one embodiment of the present invention.

FIGS. 4A to 4C illustrate an embodiment of an overall flowchart of a process for determining and setting a predetermined location or time which can be used in step 203 described in FIG. 2.

FIG. 4A shows one embodiment of the flowchart of the process only performed by one or more terminal devices. FIGS. 4B and 4C illustrate another embodiment of the flowchart of the process performed by one or more terminal devices and a server.

The one embodiment described in FIG. 4A will be first explained below.

For example, at least one terminal device or each of the terminal devices among a plurality of terminal devices which are currently or were in the vicinity of the user may perform the process described in FIG. 4A. Alternatively, the terminal device which may be always carried by a user may perform the process described in FIG. 4A.

First, the embodiment described in FIG. 4A will be explained below.

With Reference now to FIG. 4A, in step 401, the terminal device starts the process mentioned above.

In step 402, the terminal device detects one or more terminal devices. The terminal devices may the ones with which a communication can be allowable or the change of the numbers of terminal devices in the vicinity of the user or the number of terminal devices with which a communication can be allowable. The detection may be carried out, for example, at a predetermined time interval, such as hour, a day, a week or a month; according to a predetermined time schedule; in a case where the terminal device passes a predetermined place; or in a case where the numbers of terminal devices in the vicinity of the user or the number of terminal devices with which a communication can be allowable is changed.

In step 403, the terminal device receives an identification information on the one or more detected terminal devices from each of the terminal devices. The identification information may comprise a set of (1) ID of a terminal device which was detected through the communication function mentioned in step 204; (2) location information of the terminal device; and (3) time information that the terminal device was detected.

In step 404, the terminal device determines a predetermined location, time or combination of these, based on the received identification information. An example how to determine a predetermined location or time will be explained by referring to FIGS. 7A to 7C mentioned below. The terminal device may transfer the determined predetermined location or predetermined time to others among the plurality of terminal devices.

In step 405, the terminal device sets the determined predetermined location or time as a condition for starting the receipt of a frequency of coexistence.

In step 406, the terminal device terminates the process mentioned above.

Accordingly, the terminal device can use the updated predetermined location or time for the condition for starting the receipt of a frequency of coexistence. Further, a condition for starting the receipt of a frequency of coexistence can be updated automatically only using a plurality of terminal devices.

Next, the embodiment described in FIGS. 4B and 4C will be explained below. The steps described in FIG. 4B are performed by each of the terminal devices or a terminal device which may be always carried by a user. The steps described in FIG. 4C will be performed by a server.

With Reference now to FIG. 4B, in step 411, the terminal device starts the process mentioned above.

Steps 412 and 413 correspond to steps 402 and 403 described in FIG. 4A, respectively. Accordingly, the explanations of steps 412 and 413 will be omitted here.

In step 414, the terminal device transmits the received identification information to a server.

According to steps 403 and 414, the identification information is received from each of the terminal devices and then a specific terminal device transmits the identification information to a server. Alternatively, each of the terminal devices may independently transmit the identification information to a server.

With reference now to FIG. 4C, in step 421, the server starts the process mentioned above.

In step 422, the server receives the identification information from the terminal device.

In step 423, the server determines a predetermined location, time or combination of these, based on the received identification information. An example how to determine a predetermined location or time will be explained by referring to FIGS. 7A to 7C mentioned below.

In step 424, the server sends the determined predetermined location, time or combination of these to the terminal device which sent the identification information or each of the terminal devices. In a case where the determined predetermined location, time or combination of these is sent to the terminal device which sent the identification information, this terminal device also sends the predetermined location, time or combination of these to other terminal devices.

In step 425, the server terminates the process mentioned above.

With reference now back to FIG. 4B, in step 415, the terminal device receives the predetermined location, time or combination of these from the server.

In step 416, the terminal device sets the determined predetermined location or time as a condition for starting the receipt of a frequency of coexistence. Accordingly, the terminal device can use the updated predetermined location or time for the condition for starting the receipt of a frequency of coexistence.

Accordingly, the terminal device can use the updated predetermined location or time for the condition for starting the receipt of a frequency of coexistence. Further, a condition for starting the receipt of a frequency of coexistence can be updated automatically using a plurality of terminal devices and a server.

In step 417, the terminal device terminates the process mentioned above.

With reference now to FIG. 5, FIG. 5 illustrates an embodiment of a list of frequencies of coexistence.

The list of frequencies of coexistence can be any form, for example, a table, a text, a DB. In FIG. 5, the list of frequencies of coexistence is illustrated in a form of a table.

The table (501) shows a list of frequencies of coexistence at a specific location, for example, an office entrance.

The source terminal device, "Source", refers to a terminal device which recognizes other terminal devices using the communication function mentioned in step 204. For example, the recognition can be made by receiving an ID associated with the target terminal device from the target terminal device.

The target terminal device, "Target", refers to a terminal device which is or was recognized by the source terminal device.

Each line in the table (501) refers to a frequency of coexistence for each of the target terminal devices.

For example, the smartphone recognizes the laptop A, the laptop B, the smart watch, the smart ring, the tablet 1 and the employee ID card at a frequency of 2%, 83%, 72%, 86%, 31% and 97%, respectively, in a case where the smartphone is at the office entrance (511).

The list of frequencies of coexistence may be generated and updated, according to a predetermined time interval, such as a second, a minute, an hour or a day; according to a predetermined time schedule; or a predetermined place where the terminal device passes.

With reference now to FIG. 6, FIG. 6 illustrates an embodiment of a list of frequencies of coexistence which are generated in a master terminal device or server and a list of mean values calculated from the frequencies of coexistence for each of the terminal devices.

The table (601) shows a list of frequencies of coexistence for the terminal device which now exists at a specific location, for example, an office entrance.

The existing terminal, "Existing terminal", refers to a terminal which is now in the vicinity of the user. In the table (601), the existing terminals are the following: the laptop B, the smart watch and the employee ID card.

The recognized terminal, "Recognized terminal", refers to a terminal which is or was recognized by the existing terminal. In the table (601), the recognized terminals are the following: the laptop A, the laptop B, the smart phone, the smart watch, the smart ring, the tablet 1 and the employee ID card.

The master terminal device calculates, from the frequency of coexistence, a mean value of the frequencies of coexistence, according to step 305 described in FIG. 3A. The mean value may be a geometric mean of the frequencies of coexistence.

In a case where a mean value is a geometric mean of the frequencies of coexistence, the master terminal calculates a geometric mean as the following equation.

The geometric mean=(frequency 1*frequency 2* - - - *frequency $n)^{(1/n)}$, where $n$ denotes a positive integer.

For example, the geometric mean for the smartphone is calculated as follows:

The geometric mean for the smartphone= (97%*93%*98%)/3=96%

The table (611) shows a list of mean values for the laptop A, the laptop B, the smart phone, the smart watch, the smart ring, the tablet 1 and the employee ID card. In a case where the threshold is equal to or larger than 95%, the mean value of smart phone, 96%, is larger than the threshold and the smart phone is not listed in the existing terminal device in the table (601). Accordingly, it is concluded that the smartphone associated with the mean value, 96%, is not in the vicinity of the user. Therefore, the master terminal device may notify the user of an alert to the effect that the smartphone is not in the vicinity. Further, the master terminal device may send a notification relating to an alert to each of the member terminal devices. In a case where communication application for managing the smart phone was installed, the laptop B sends to a managing server of a smart phone company an order to the effect that the smart phone shall be locked. In response to receipt the order, the managing server may lock the smart phone to avoid that the smart phone is operated by a third party.

Figure 7A:
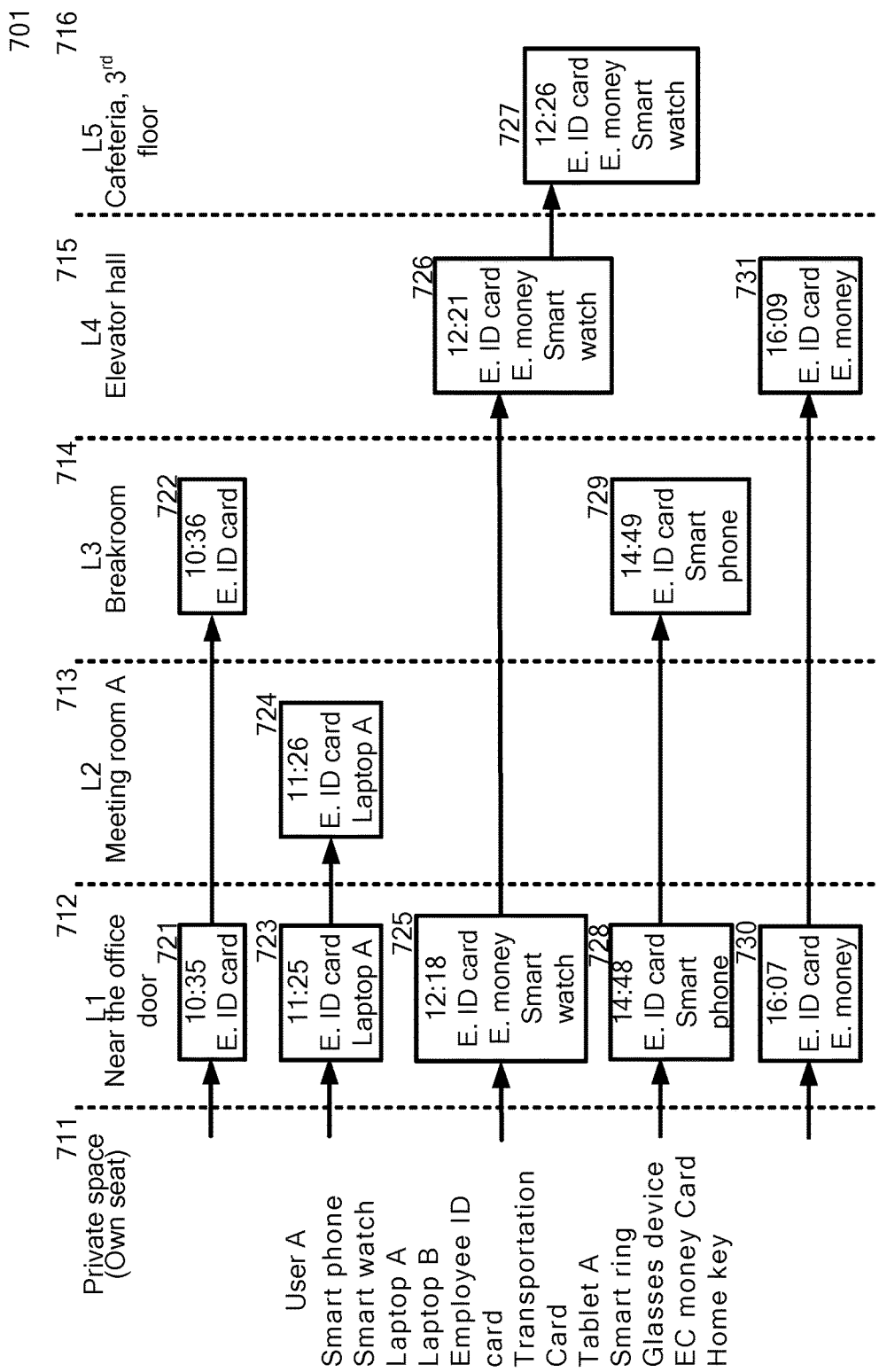
FIG. 7A illustrates a diagram for determining a predetermined location or time in a first example, in accordance with at least one embodiment of the present invention.
Figure 7B:
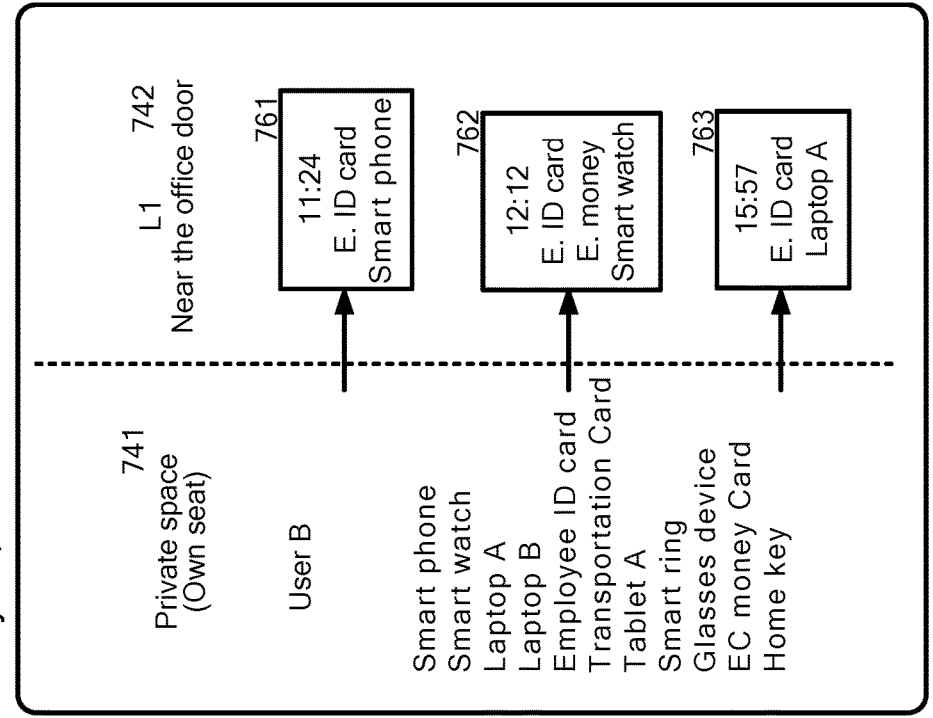
FIG. 7B illustrates a diagram for determining a predetermined location or time in a second example, in accordance with at least one embodiment of the present invention.
Figure 7C:
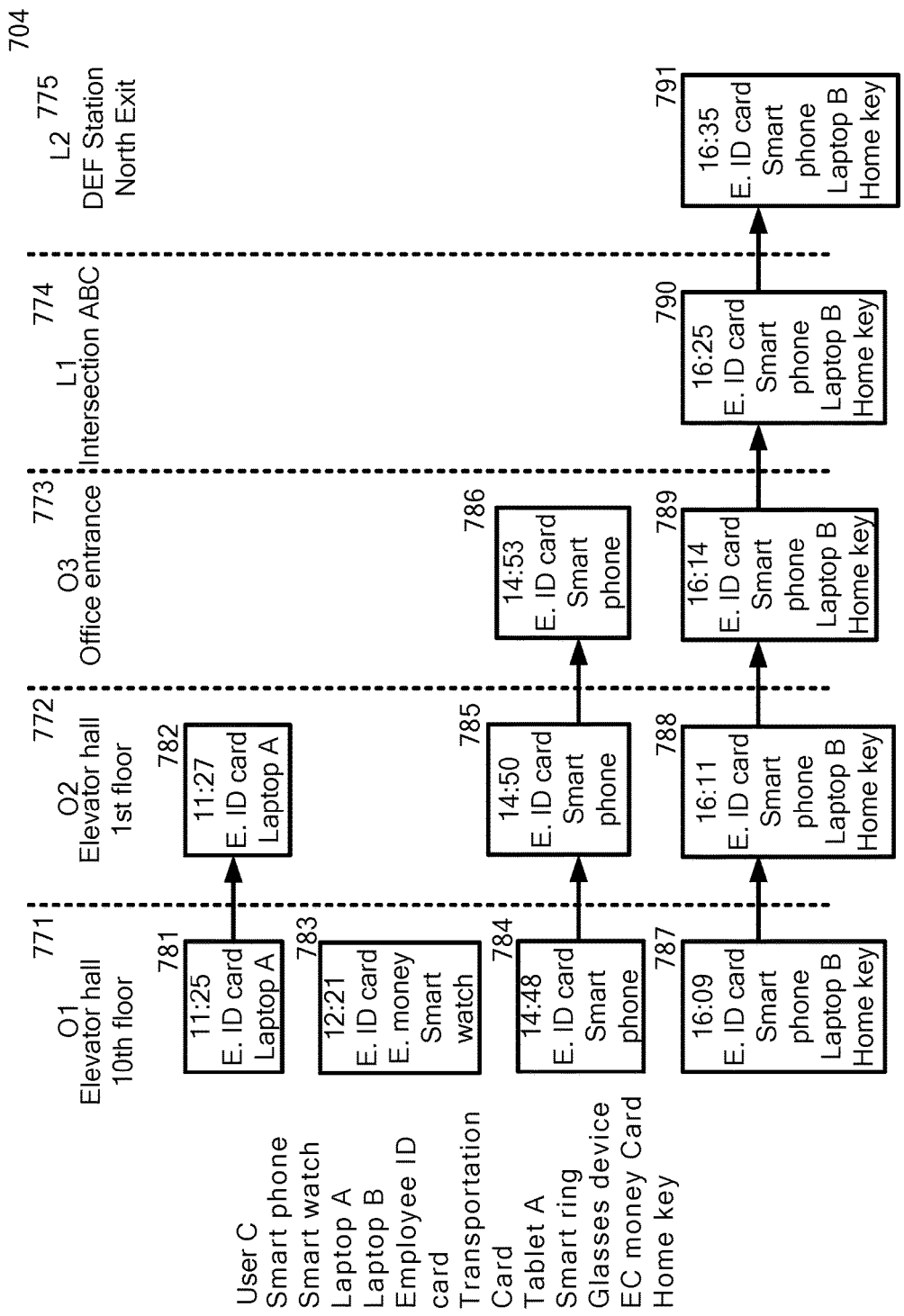
FIG. 7C illustrates a diagram for determining a predetermined location or time in a third example, in accordance with at least one embodiment of the present invention.

FIGS. 7A to 7C illustrate an embodiment of a diagram for determining a predetermined location or time.

A predetermined location or time can be determined prior to start of the process described in FIG. 2, according to one embodiment described in FIGS. 7A to 7C. As described in FIG. 4A, a terminal device can determine and set a predetermined location or time. Alternatively, a server can determine and set a predetermined location or time.

With reference now to FIG. 7A, FIG. 7A describes that a predetermined location can be determined using information on that a user always has a specific set of terminal devices at a common specific location.

Let us suppose the following situations, A1 to A3.

A1: A plurality of Wi-Fi® access points are located at the following consecutive points from a private space (711), that is, the own seat of the user A at the office: L1 (near the office door) (712), L2 (Meeting room A) (713), L3 (Breakroom) (714), L4 (Elevator hall) (715) and L5 (Cafeteria, 3$^{rd}$ floor) (716).

A2: The user A has the following terminal devices: the smart phone, the smart watch, the laptop A, the laptop B, the employee ID card, the transportation card, the tablet A, the smart ring, the glasses device, the EC money card and the home key.

A3: The user A always passes L1 (712).

According to information on the terminal devices mentioned above, it is found that the user A has the employee ID card at L1 (see 722, 723, 725, 728 and 730).

Therefore, a terminal device or a server can determine that L1 is the predetermined location. Accordingly, each of the terminal devices sets the determined L1 as a condition for starting the receipt of a frequency of coexistence.

With reference now to FIG. 7B, FIG. 7B describes that a predetermined location and time can be determined using information on that a user always has a set of specific terminal devices at a specific location on different times and days.

Let us suppose the following situations, B1 to B3.

B1: A Wi-Fi® access point is located at L1 (near the office door) (742) which is a consecutive point from a private space (741), that is, the own seat of the user B at the office.

B2: The user B has the following terminal devices: the smart phone, the smart watch, the laptop A, the laptop B, the employee ID card, the transportation card, the tablet A, the smart ring, the glasses device, the EC money card and the home key.

B3: The user B always passes L1 (742).

According to information on the terminal devices mentioned above, it is found that the user B always has a set of the employee ID card, the EC money card and the smart watch at L1 (see 724) at between 12:00 to 12:30 on different days (see 753 and 762), that is, May 21 and 22, 2016 (see 702 and 703).

Therefore, a terminal device or a server can determine that L1 is the predetermined location and 12:00 to 12:30 is the predetermined time. Accordingly, each of the terminal devices sets the determined L1 and the time, 12:00 to 12:30, as a condition for starting the receipt of a frequency of coexistence.

With reference now to FIG. 7C, FIG. 7C describes that a predetermined location can be determined using information on that a user always has a specific set of terminal devices at different specific locations.

Let us suppose the following situations, C1 and C2.

C1: A plurality of Wi-Fi® access points are located at the following points: O1 (Elevator hall, 10th floor) (771), O2 (Elevator hall, 1st floor) (772), O3 (Office entrance) (773), L1 (Intersection ABC) (774) and L2 (DEF Station, North Exit) (775). The points, O1 to O3, are located in an office space where the user C works. The points, L1 and L2, are located in a public space.

C2: The user C has the following terminal devices: the smart phone, the smart watch, the laptop A, the laptop B, the employee ID card, the transportation card, the tablet A, the smart ring, the glasses device, the EC money card and the home key.

According to information on the terminal devices mentioned above, it is found that the user C has a set of the employee ID, the smart phone, the Laptop B and the home key at the consecutive points, O1 to O3 and L1 to L2 (see 771 to 773 and 774 to 775). This also means that in a case where the user C moves from office space to a public space, the user C needs to have the set mentioned above and the number of the terminal devices was remained.

Therefore, a terminal device or a server can determine that L1 in the first public space is the predetermined location. Accordingly, each of the terminal devices sets the determined L1 as a condition for starting the receipt of a frequency of coexistence.

As explained by referring to FIGS. 7A and 7B, the predetermined location or the predetermined time can be determined using history information that the user moved, information on time that the user moved, or a combination of these.

Figure 8A:
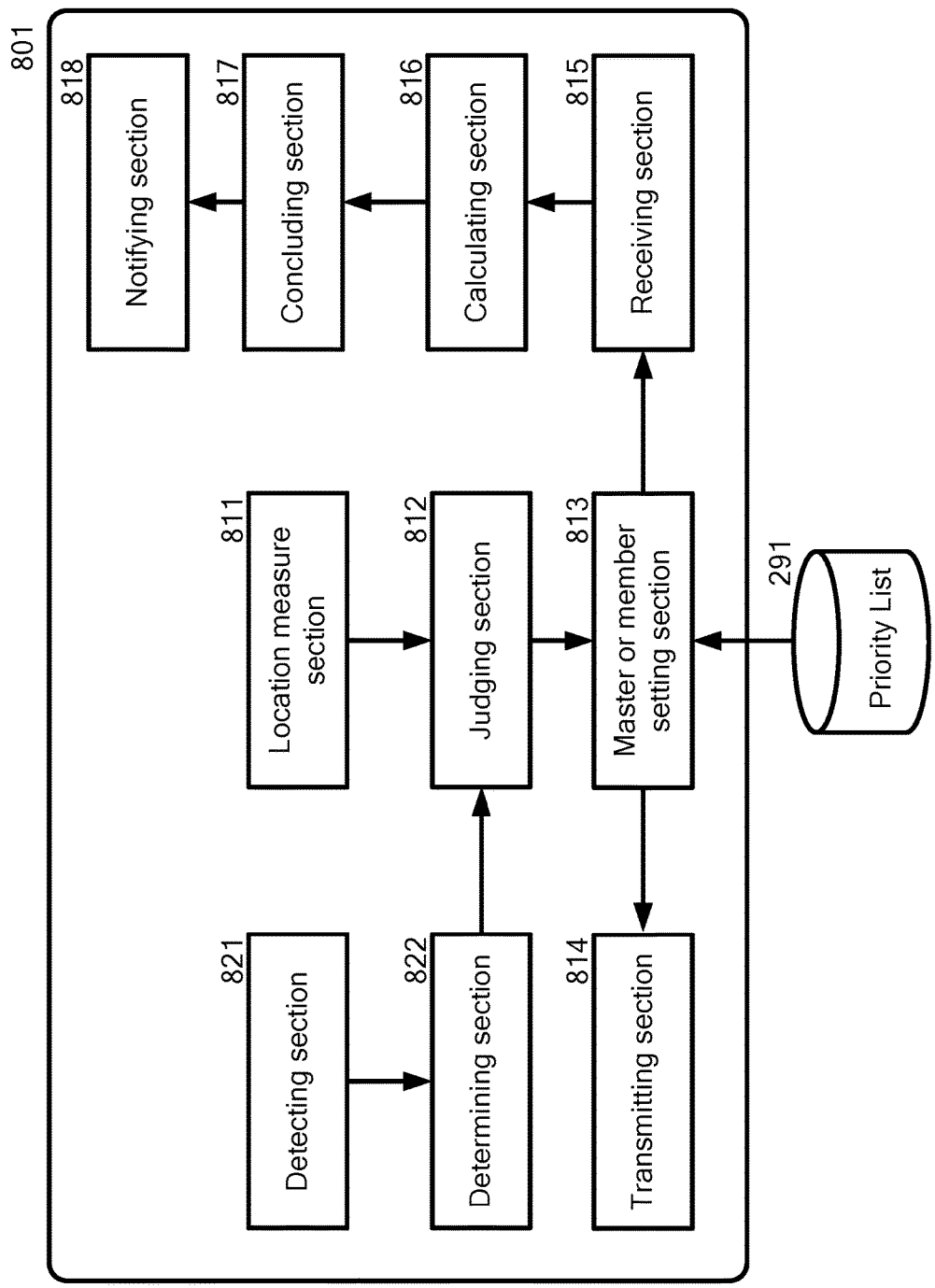
FIG. 8A illustrates an overall functional block diagram of a terminal device hardware used in accordance with the overall flowchart described in FIG. 2, FIG. 3A and FIGS. 4A and 4B, in accordance with at least one embodiment of the present invention.

With reference now to FIG. 8A, FIG. 8A illustrates an embodiment of an overall functional block diagram of a terminal device hardware used in accordance with the embodiment of the overall flowchart described in FIG. 2, FIG. 3A and FIGS. 4A and 4B.

The terminal device (801) may correspond to the computer (101) described in FIG. 1.

The terminal device (801) may comprise a location measure section (811), a judging section (812), a master or member setting section (813), a transmitting section (814), a receiving section (815), a calculating section (816), and a concluding section (817). Further, the terminal device (801) may comprise a notifying section (818). In a case where the terminal device (801) may determine a predetermined location or time, the terminal device (801) may comprise a detecting section (821) and a determining section (822).

The location measure section (811) may perform step 202 described in FIG. 2.

The judging section (812) may perform step 203 described in FIG. 2.

The master or member setting section (813) may perform steps 204 to 209 described in FIG. 2. Further, the master or member setting section (813) may perform steps 312 to 314 described in FIG. 3B in a case where the terminal device (801) is set as a member terminal device.

The transmitting section (814) may perform step 210 described in FIG. 2 in a case where the terminal device (801) is set as a master terminal device.

The receiving section (815) receives a frequency of coexistence from each of one or more member terminal devices among the plurality of terminal devices.

The receiving section (815) may perform steps 302 and 303 described in FIG. 3A in a case where the terminal device (801) is set as a master terminal device.

The calculating section (816) calculates, from the frequency of coexistence which is stored in the master terminal device and the received frequencies of coexistence, a mean value of the frequencies of coexistence for each of terminal devices which are not currently in the vicinity of the user.

The calculating section (816) may perform steps 304 and 305 described in FIG. 3A in a case where the terminal device (801) is set as a master terminal device.

The concluding section (817) concludes that a terminal device associated with the mean value is not in the vicinity of the user if the mean value is equal to or larger than a predetermined threshold.

The concluding section (817) may perform steps 306 and 307 described in FIG. 3A in a case where the terminal device (801) is set as a master terminal device.

The notifying section (818) may notify a user of an alert.

The notifying section (818) may perform step 308 described in FIG. 3A in a case where the terminal device (801) is set as a master terminal device.

The detecting section (821) may detect one or more terminal devices with which a communication can be allowable. The detecting section (821) may detect the change of the numbers of terminal devices in the vicinity of the user or the number of terminal devices with which a communication can be allowable.

The detecting section (821) may perform step 402 described in FIG. 4A.

The determining section (822) may determine a predetermined location or predetermined time. The determining section (822) may determine the predetermined location or the predetermined time, using history information that the user moved, information on time that the user moved, or a combination of these.

The determining section (822) may determine the predetermined location, using information on a location where the number of the terminal devices in the vicinity of the user or a set of terminal devices was remained or changed. The determining section (822) may determine the predetermined location, using information on a time that the number of terminal devices in the vicinity of the user was remained or changed.

The determining section (822) may determine the predetermined time, using a time in a case where the number of the terminal devices in the vicinity of the user or a set of terminal devices was remained or changed. The determining section (822) may determine the predetermined time, using a time period that a set of terminal devices are in the vicinity of the user.

The determining section (822) may transfer the determined predetermined location or predetermined time to other terminal devices.

The determining section (822) may perform steps 403 to 405 described in FIG. 4A and steps 413 to 424 described in FIG. 4A.

Figure 8B:
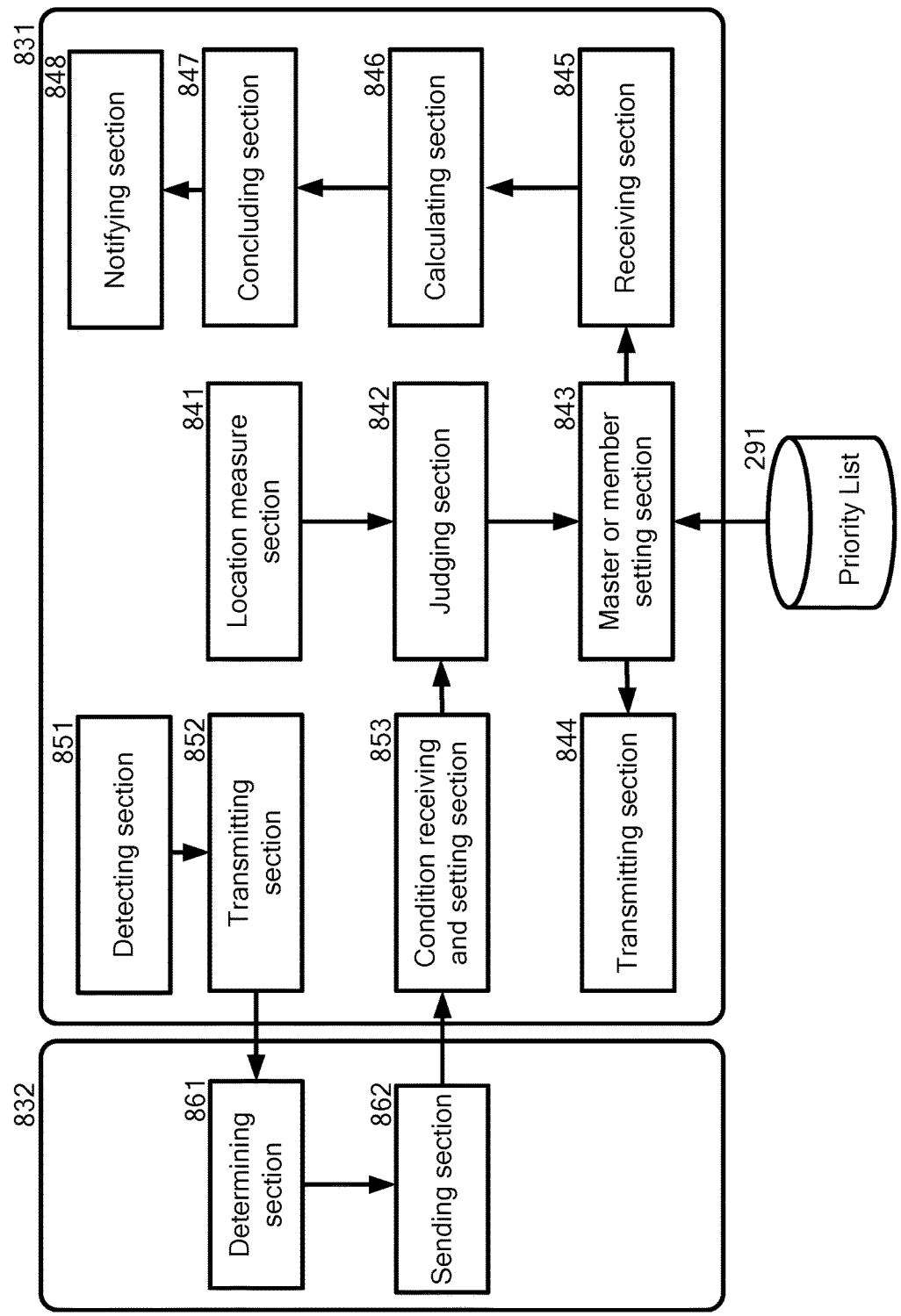
FIG. 8B illustrates an overall functional block diagram of a terminal device hardware in accordance with the overall flowchart described in FIG. 2, FIG. 3A and FIGS. 4A and 4B; and a server hardware used in accordance with the overall flowchart described in FIG. 3B and FIG. 4C, in accordance with at least one embodiment of the present invention.

With reference now to FIG. 8B, FIG. 8B illustrates an embodiment of an overall functional block diagram of a terminal device hardware in accordance with the embodiment of the overall flowchart described in FIG. 2, FIG. 3A and FIGS. 4A and 4B; and a server hardware used in accordance with the embodiment of the overall flowchart described in FIGS. 3B and 4C.

The terminal device (831) may correspond to the computer (101) described in FIG. 1. The server (832) may have the similar hardware component of the computer (101). The terminal device (831) can communicate with the server through an internet or an intranet.

The terminal device (831) may comprise a location measure section (841), a judging section (842), a master or member setting section (843), a transmitting section (844), a receiving section (845), a calculating section (846), and a concluding section (847). Further, the terminal device (831) may comprise a notifying section (848). For the purpose of determining a predetermined location or time, the terminal device (801) may comprise a detecting section (851), a transmitting section (852) and a condition receiving and setting section (853).

The location measure section (841) corresponds to the location measure section (811) described in FIG. 8A. The location measure section (841) may perform step 202 described in FIG. 2.

The judging section (842) may correspond to the judging section (812) described in FIG. 8A. The judging section (842) may perform step 203 described in FIG. 2.

The master or member setting section (843) may correspond to the master or member setting section (813) described in FIG. 8A. The master or member setting section (843) may perform steps 204 to 209 described in FIG. 2. Further, the master or member setting section (813) may perform steps 312 to 314 described in FIG. 3B in a case where the terminal device (831) is set as a member terminal device.

The transmitting section (844) may correspond to the transmitting section (814) described in FIG. 8A. The transmitting section (844) may perform step 210 described in FIG. 2 in a case where the terminal device (831) is set as a master terminal device.

The receiving section (845) may correspond to the receiving section (815) described in FIG. 8A. The receiving section (845) may perform steps 302 and 303 described in FIG. 3A in a case where the terminal device (831) is set as a master terminal device.

The calculating section (846) may correspond to the calculating section (816) described in FIG. 8A. The calculating section (846) may perform steps 304 and 305 described in FIG. 3A in a case where the terminal device (831) is set as a master terminal device.

The concluding section (847) may correspond to the concluding section (817) described in FIG. 8A. The concluding section (847) may perform steps 306 and 307 described in FIG. 3A in a case where the terminal device (831) is set as a master terminal device.

The notifying section (848) may correspond to the notifying section (818) described in FIG. 8A. The notifying section (848) may perform step 308 described in FIG. 3A in a case where the terminal device (831) is set as a master terminal device.

The detecting section (851) may detect one or more terminal devices with which a communication can be allowable. The detecting section (851) may detect the change of the numbers of terminal devices in the vicinity of the user or the number of terminal devices with which a communication can be allowable.

The detecting section (851) may perform step 412 described in FIG. 4B.

The transmitting section (852) may transmit identification information on the one or more detected terminal devices to the server (832).

The transmitting section (852) may perform steps 413 and 414 described in FIG. 4B.

The condition receiving and setting section (853) may receive a predetermined location or predetermined time from the server (832).

The condition receiving and setting section (853) may perform steps 415 and 416.

For the purpose of determining a predetermined location or time, the server (832) may comprise a determining section (861) and a sending section (862).

The determining section (861) may determine a predetermined location or predetermined time, based on the identification information on the one or more detected terminal devices.

The determining section (861) may perform steps 422 and 423 described in FIG. 4C.

The sending section (862) may send the determined predetermined location or predetermined time to the terminal device (831).

The sending section (862) may perform step 424 described in FIG. 4C.

Figure 9:
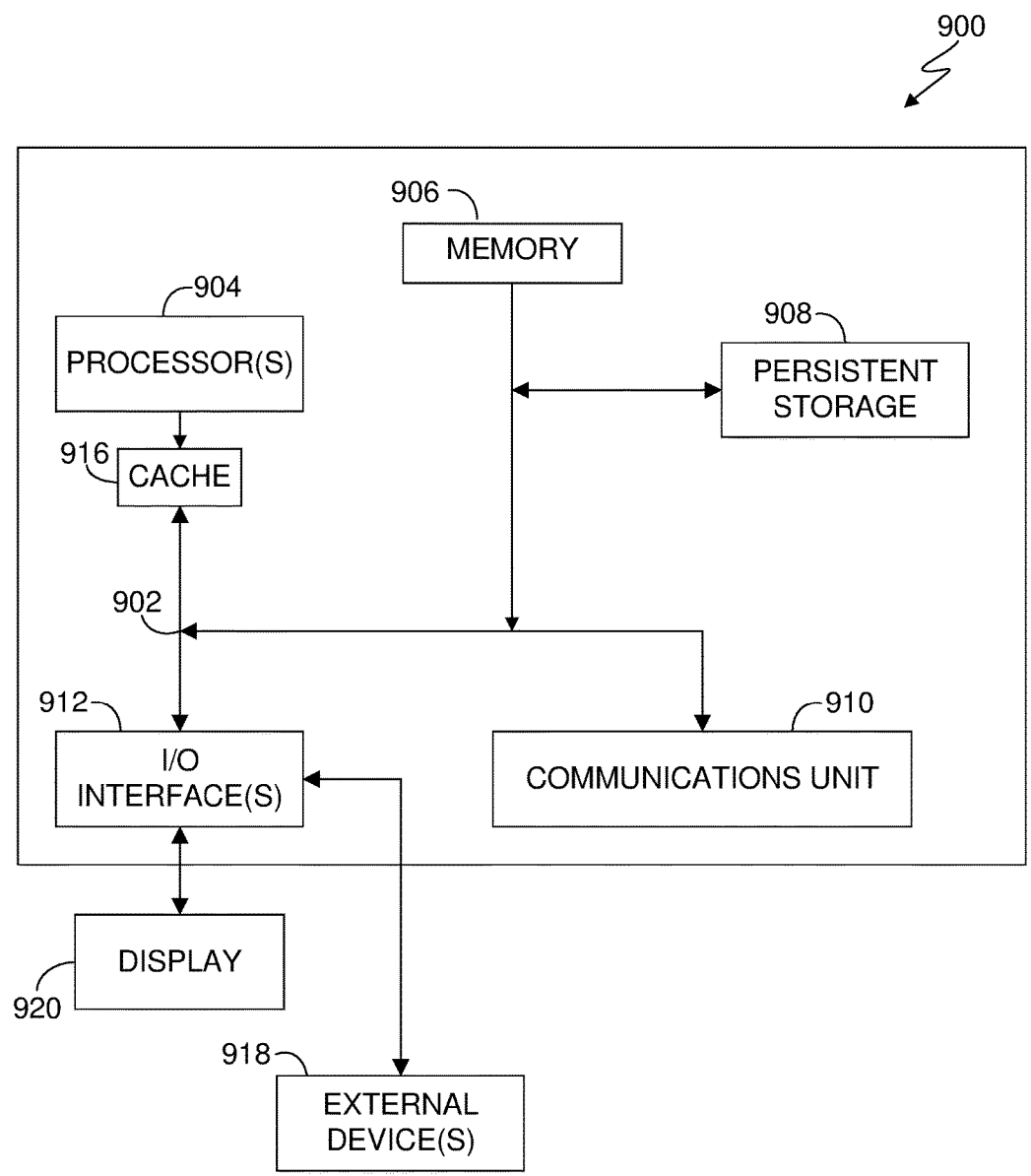
FIG. 9 is a block diagram depicting various logical elements for a computer system capable of executing program instructions, in accordance with at least one embodiment of the present invention.

FIG. 9 is a block diagram depicting components of a computer 900 suitable for executing the method according to the present invention. FIG. 9 displays the computer 900, the one or more processor(s) 904 (including one or more computer processors), the communications fabric 902, the memory 906, the RAM, the cache 916, the persistent storage 908, the communications unit 910, the I/O interfaces 912, the display 920, and the external devices 918. It should be appreciated that FIG. 9 provides only an illustration of one embodiment and does not imply any limitations with regard to the environments in which different embodiments may be implemented. Many modifications to the depicted environment may be made.

As depicted, the computer 900 operates over a communications fabric 902, which provides communications between the cache 916, the computer processor(s) 904, the memory 906, the persistent storage 908, the communications unit 910, and the input/output (I/O) interface(s) 912. The communications fabric 902 may be implemented with any architecture suitable for passing data and/or control information between the processors 904 (e.g., microprocessors, communications processors, and network processors, etc.), the memory 906, the external devices 918, and any other hardware components within a system. For example, the communications fabric 902 may be implemented with one or more buses or a crossbar switch.

The memory 906 and persistent storage 908 are computer readable storage media. In the depicted embodiment, the memory 906 includes a random access memory (RAM). In general, the memory 906 may include any suitable volatile or non-volatile implementations of one or more computer readable storage media. The cache 916 is a fast memory that enhances the performance of computer processor(s) 904 by holding recently accessed data, and data near accessed data, from memory 906.

Program instructions for the method according to the present invention may be stored in the persistent storage 908 or in memory 906, or more generally, any computer readable storage media, for execution by one or more of the respective computer processors 904 via the cache 916. The persistent storage 908 may include a magnetic hard disk drive. Alternatively, or in addition to a magnetic hard disk drive, the persistent storage 908 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of the persistent storage 908.

The communications unit 910, in these examples, provides for communications with other data processing systems or devices. In these examples, the communications unit 910 may include one or more network interface cards. The communications unit 910 may provide communications through the use of either or both physical and wireless communications links. A program embodying a method according to the present invention may be downloaded to the persistent storage 908 through the communications unit 910. In the context of some embodiments of the present invention, the source of the various input data may be physically remote to the computer 900 such that the input data may be received and the output similarly transmitted via the communications unit 910.

The I/O interface(s) 912 allows for input and output of data with other devices that may operate in conjunction with the computer 900. For example, the I/O interface 912 may provide a connection to the external devices 918, which may include a keyboard, keypad, a touch screen, and/or some other suitable input devices. External devices 918 may also include portable computer readable storage media, for example, thumb drives, portable optical or magnetic disks, and memory cards. Software and data used to practice embodiments of the present invention may be stored on such portable computer readable storage media and may be loaded onto the persistent storage 908 via the I/O interface(s) 912. The I/O interface(s) 912 may similarly connect to a display 920. The display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising, by a first terminal device among a plurality of terminal devices which are currently in a vicinity of a user: receiving an indication, wherein the indication includes the first terminal device being at predetermined location at a predetermined time; receiving a frequency of coexistence from each of one or more second terminal devices among the plurality of terminal devices, wherein the first terminal device and each of the second terminal devices each store a frequency of coexistence, wherein the frequency of coexistence shows a frequency that a terminal device which stores the frequency of coexistence and each of one or more other terminal devices coexisted in the vicinity at the predetermined location and the predetermined time; calculating, from the frequency of coexistence which is stored in the first terminal device and the received frequencies of coexistence, a mean value of the frequencies of coexistence for each of the terminal devices which are not currently in the vicinity of the user; and if the mean value is equal to or larger than a predetermined threshold, concluding that a terminal device associated with the mean value is not in the vicinity of the user.

2. The computer-implemented method according to claim 1, wherein the first terminal device is selected from the group consisting of a terminal device having a high computing performance, a terminal device having a high remaining battery, or a terminal device that the user carries.

3. The computer-implemented method according to claim 1, wherein the predetermined location or the predetermined time is determined using at least one of history information that the user moved and information on time that the user moved.

4. The computer-implemented method according to claim 1, wherein the predetermined location is determined using information on a location where a number of the terminal devices in the vicinity of the user either remained the same or changed.

5. The computer-implemented method according to claim 1, wherein the predetermined location is determined using information on a time that a number of terminal devices in the vicinity of the user either remained the same or changed.

6. The computer-implemented method according to claim 1, wherein the predetermined time is determined using a time in a case where a number of the terminal devices in the vicinity of the user or a set of terminal devices either remained the same or changed.

7. The computer-implemented method according to claim 1, wherein the predetermined time is determined using a time period that a set of terminal devices are in the vicinity of the user.

8. The computer-implemented method according to claim 1, further comprising, by at least one terminal device among a plurality of terminal devices which are currently or were in the vicinity of the user: detecting one or more terminal devices with which a communication can be allowable or the change of a numbers of terminal devices in the vicinity of the user or a number of terminal devices with which a communication can be allowable; and in response to the detection, determining a predetermined location or predetermined time.

9. The computer-implemented method according to claim 8, wherein the predetermined location or predetermined time is transferred to others among the plurality of terminal devices.

10. The computer-implemented method according to claim 1, further comprising, by at least one terminal device among a plurality of terminal devices which are currently or were in the vicinity of the user: detecting one or more terminal devices with which a communication can be allowable or the change of a numbers of terminal devices in the vicinity of the user or a number of terminal devices with which a communication can be allowable; transmitting identification information on the one or more detected terminal devices to a server; and receiving a predetermined location or predetermined time from the server, wherein the predetermined location or predetermined time is determined by the server, based on the identification information on the one or more detected terminal devices.

11. The computer-implemented method according to claim 1, wherein the receipt of the frequency of coexistence is carried out by a communication between the first terminal device and each of the second terminal devices.

12. The computer-implemented method according to claim 1, wherein the receipt of the frequency of coexistence is carried out by an access point or server between the first terminal device and each of the second terminal devices.

13. The computer-implemented method according to claim 1, wherein in response to the conclusion that a terminal device associated with the mean value is not in the vicinity of the user, the first terminal device further carries out notifying the user of an alert.

14. The computer-implemented method according to claim 1, wherein, in response to the conclusion that a terminal device associated with the mean value is not in the vicinity of the user, at least one terminal device among the plurality of terminal devices which are currently in the vicinity of the user is made unusable.

15. The computer-implemented method according to claim 1, wherein, in response to the conclusion that a terminal device associated with the mean value is not in the vicinity of the user, an authentication level associated with at least one terminal device among the plurality of terminal devices which are currently in the vicinity of the user is changed.

16. A terminal device comprising: one or more processors; one or more computer readable storage media; computer program instructions; the computer program instructions being stored on the one or more computer readable storage media; the computer program instructions comprising instructions to, by a first terminal device among a plurality of terminal devices which are currently in the vicinity of the user: receive an indication, wherein the indication includes the first terminal being at a predetermined location at a predetermined time; receive a frequency of coexistence from each of one or more second terminal devices among the plurality of terminal devices, wherein the first terminal device and each of the second terminal devices each store a frequency of coexistence; the frequency of coexistence shows a frequency that a terminal device which stores the frequency of coexistence and each of one or more other terminal devices coexisted in the vicinity at the predetermined location and the predetermined time; calculate, from the frequency of coexistence which is stored in the first terminal device and the received frequencies of coexistence, a mean value of the frequencies of coexistence for each of the terminal devices which are not currently in the vicinity of the user; and if the mean value is equal to or larger than a predetermined threshold, conclude that a terminal device associated with the mean value is not in the vicinity of the user.

17. A computer program product comprising one or more computer readable storage media and program instructions stored on said one or more computer readable storage media, said program instructions comprising instructions to, by a first terminal device, the first terminal device being among a plurality of terminal devices which are currently in the vicinity of the user: receive an indication, wherein the indication includes the first terminal being at a predetermined location at a predetermined time; receive a frequency of coexistence from each of one or more second terminal devices among the plurality of terminal devices, wherein the first terminal device and each of the second terminal devices each store a frequency of coexistence, wherein the frequency of coexistence shows a frequency that a terminal device which stores the frequency of coexistence and each of one or more other terminal devices coexisted in the vicinity at the predetermined location and the predetermined time; calculate, from the frequency of coexistence which is stored in the first terminal device and the received frequencies of coexistence, a mean value of the frequencies of coexistence for each of the terminal devices which are not currently in the vicinity of the user; and if the mean value is equal to or larger than a predetermined threshold, conclude that a terminal device associated with the mean value is not in the vicinity of the user.

* * * * *